June 30, 1953 S. G. BLUMENSAADT 2,643,758
APPARATUS FOR WIRE SPRINGS
Filed Sept. 2, 1947 9 Sheets-Sheet 4

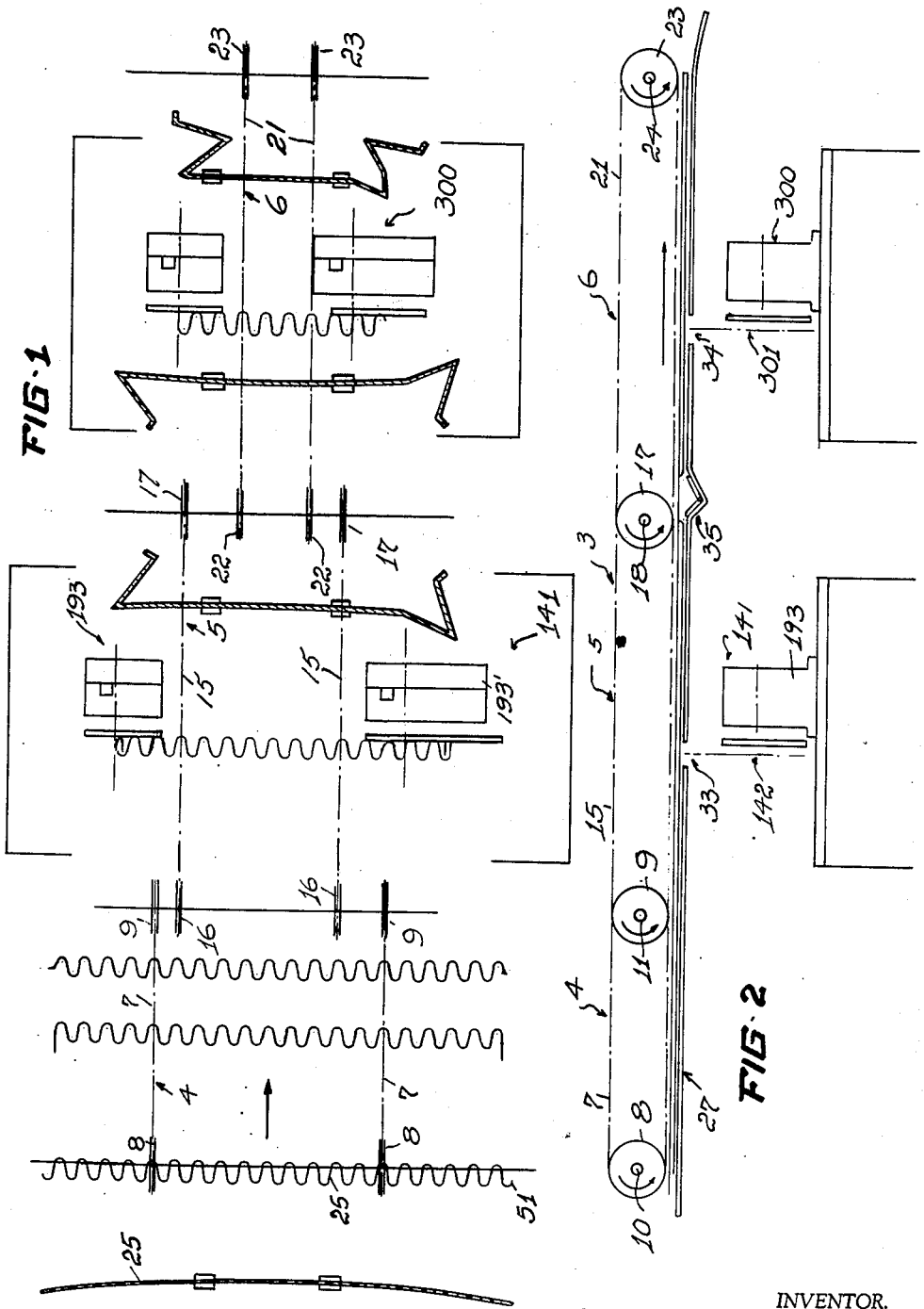

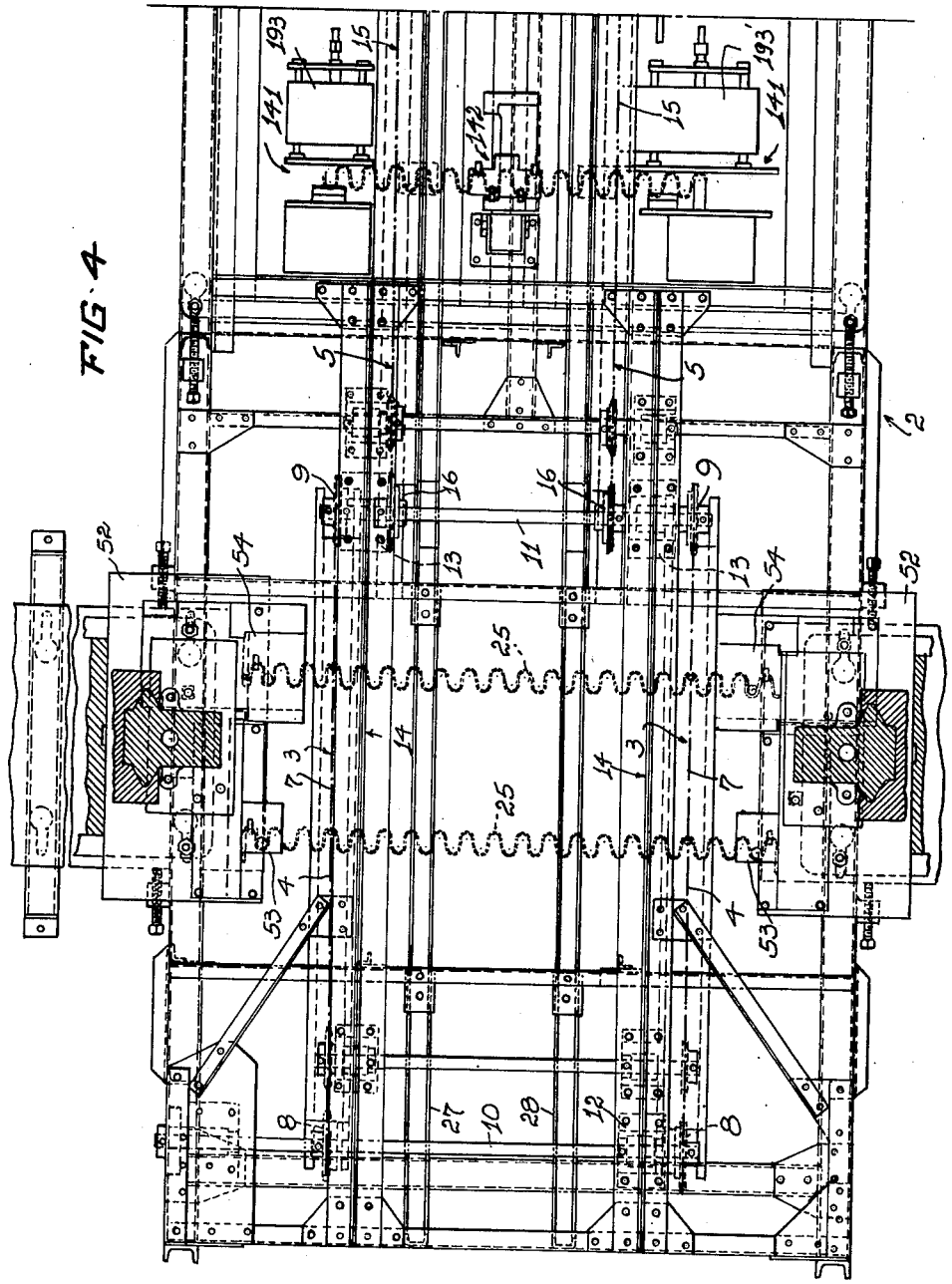

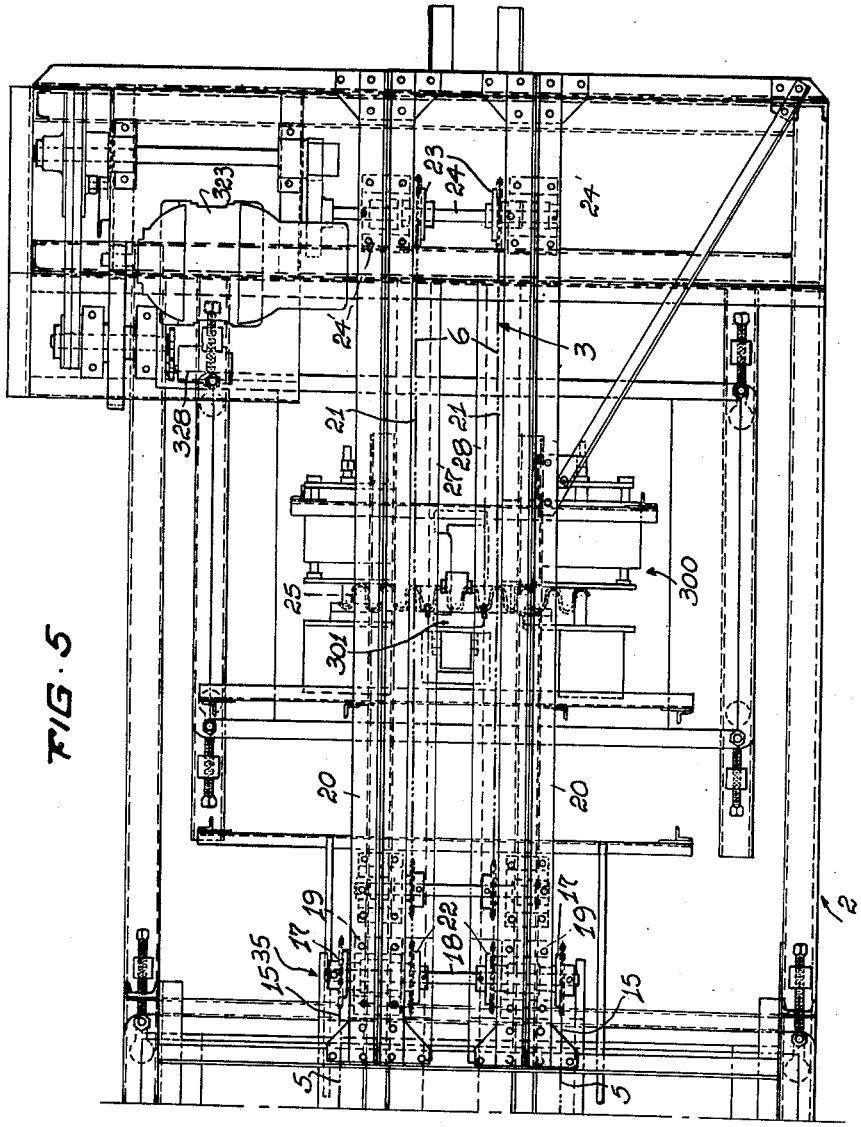

INVENTOR.
SVEND G. BLUMENSAADT
BY
ATT.

INVENTOR.
SVEND G. BLUMENSAADT
BY Gustav A. Wolff
ATT.

INVENTOR.
SVEND G. BLUMENSAADT

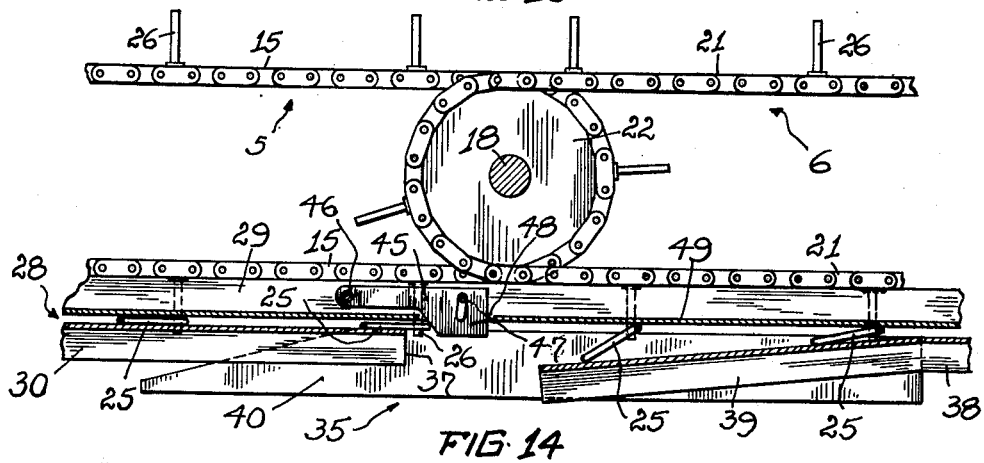
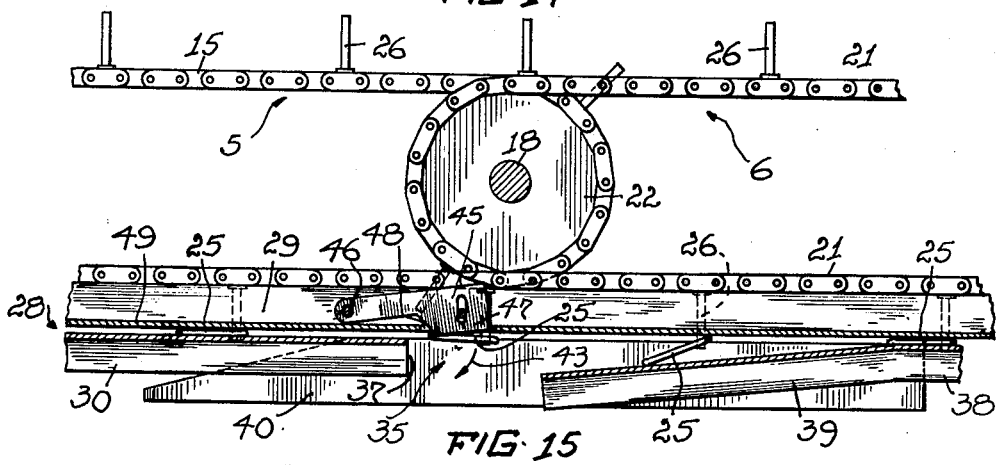
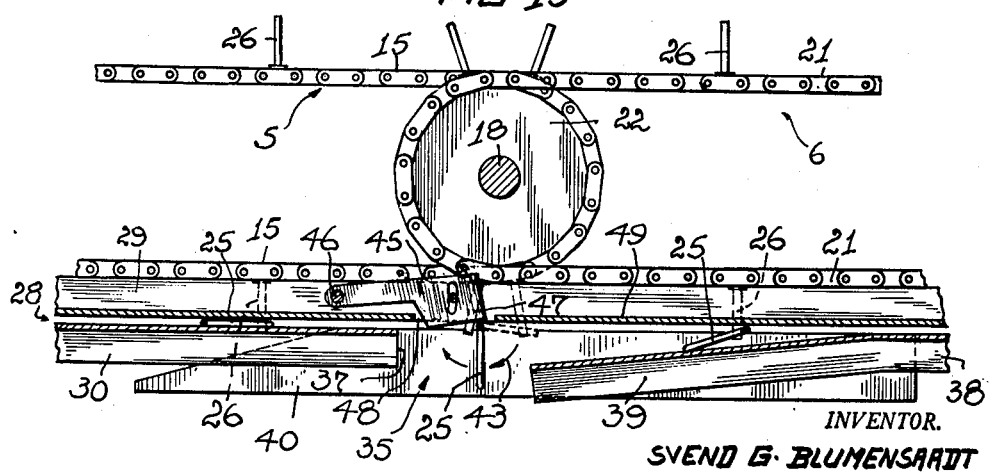

June 30, 1953  S. G. BLUMENSAADT  2,643,758
APPARATUS FOR WIRE SPRINGS
Filed Sept. 2, 1947  9 Sheets-Sheet 9
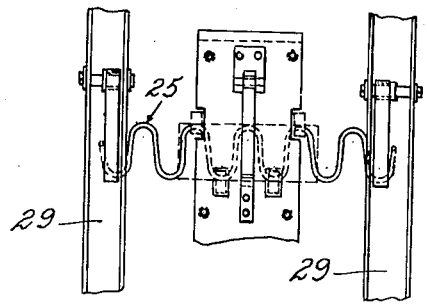
FIG. 16
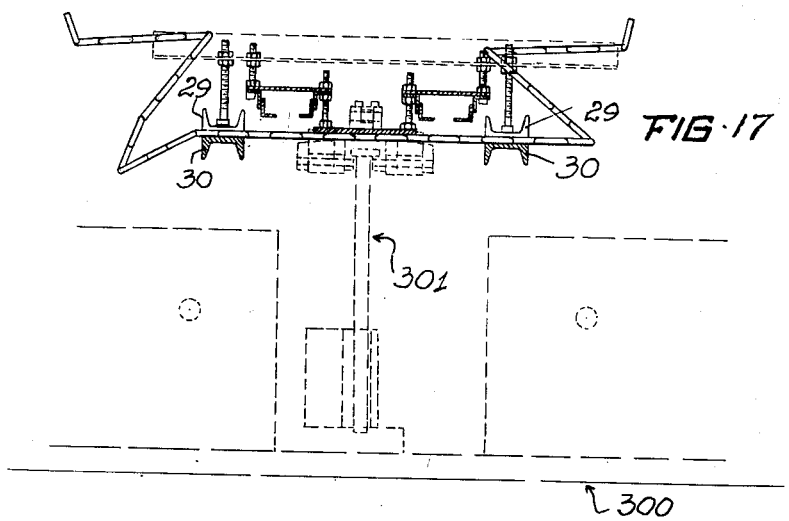
FIG. 17
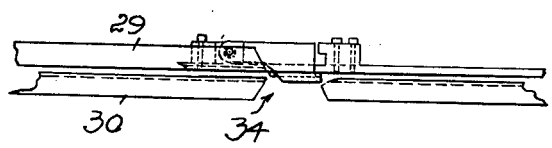
FIG. 18
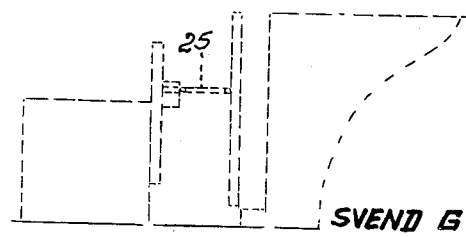
INVENTOR.
SVEND G. BLUMENSAADT
BY *Gustav A. Wolff*
ATT.

Patented June 30, 1953

2,643,758

UNITED STATES PATENT OFFICE 2,643,758

APPARATUS FOR WIRE SPRINGS

Svend G. Blumensaadt, Beachwood Village, Ohio, assignor to The Universal Wire Spring Company, Cleveland, Ohio, a corporation of Ohio Application September 2, 1947, Serial No. 771,592

4 Claims. (Cl. 198—33)

This invention refers to an apparatus for manufacturing wire springs from corrugated steel wire strips embodying oppositely extended loops connected by substantially straight wire portions, which wire springs include slightly curved resting portions and supporting and attachment means integrally extended from the resting portions. Wire springs of this type are manufactured from corrugated wire strips by twisting and shaping their end loops into attachment means and twisting some of their substantially straight wire portions to form the wire strips with sharp-edged bends or folds defining specific resting portions and specific supporting portions, all for the purpose of subjecting the springs under load principally to torsional stresses in their twisted straight wire portions.

The general object of the present invention is a wire spring forming apparatus provided with conveying means adapted to advance corrugated wire strips in successive steps to and through spaced forming and twisting devices, which shape the wire strips in successive steps to wire springs having specific supporting and attachment means integrally extended from the resting portions, the conveying means including inverting means to rotate the wire strips to inverted positions when carried by the conveying means from a twisting device to the next one.

Other objects and novel features of construction, combinations and relations of parts by which the object in view has been attained, will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 1 is a diagrammatic view illustrating the sequence of operations by which a corrugated wire strip of sinuous form is carried by conveying means to and through the shaping and twisting stations of the apparatus.

Fig. 2 is a side-view of the illustration shown in Fig. 1; and

Fig. 3 is a side-view of a wire strip to be shaped and twisted to a wire spring.

Figs. 4 and 5 disclose a plan view of a wire spring forming apparatus constructed in accordance with the invention.

Figure 6:
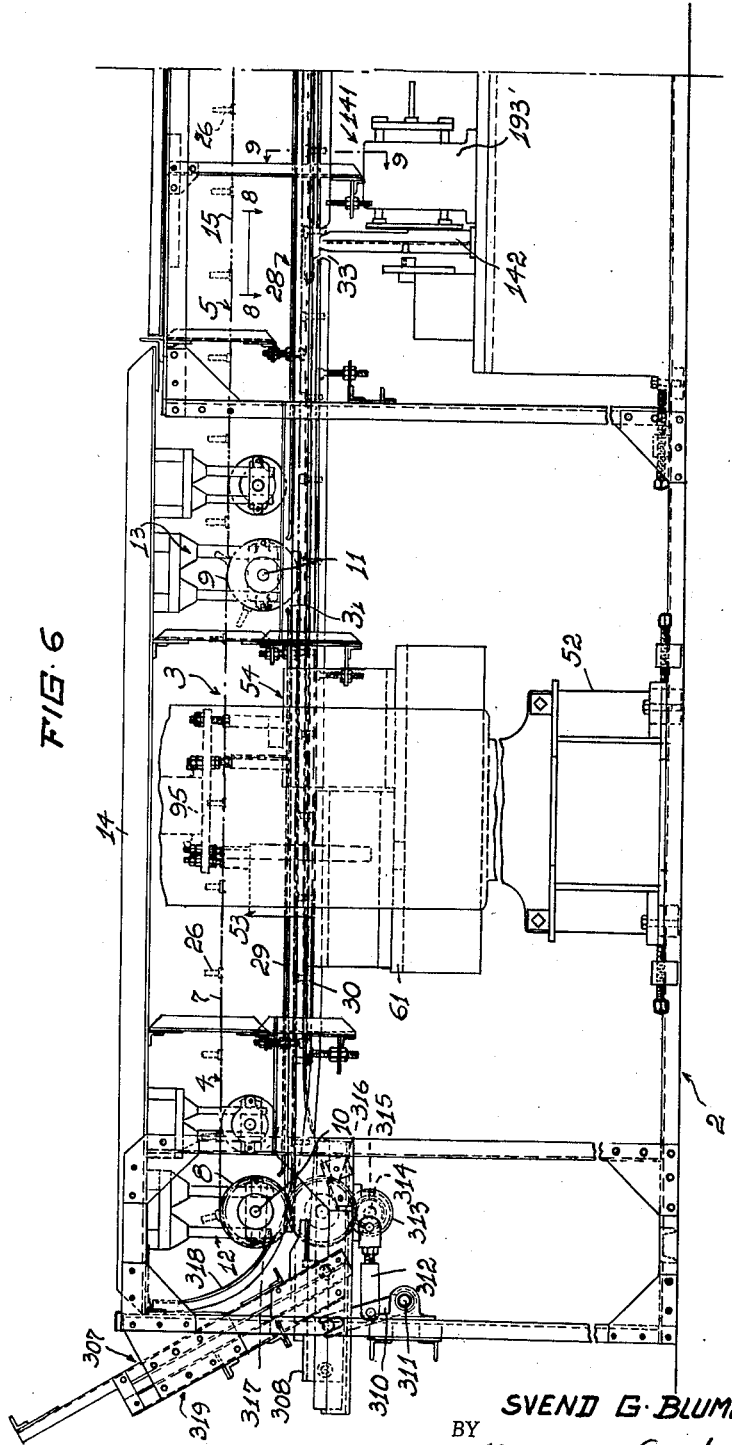
Figure 7:
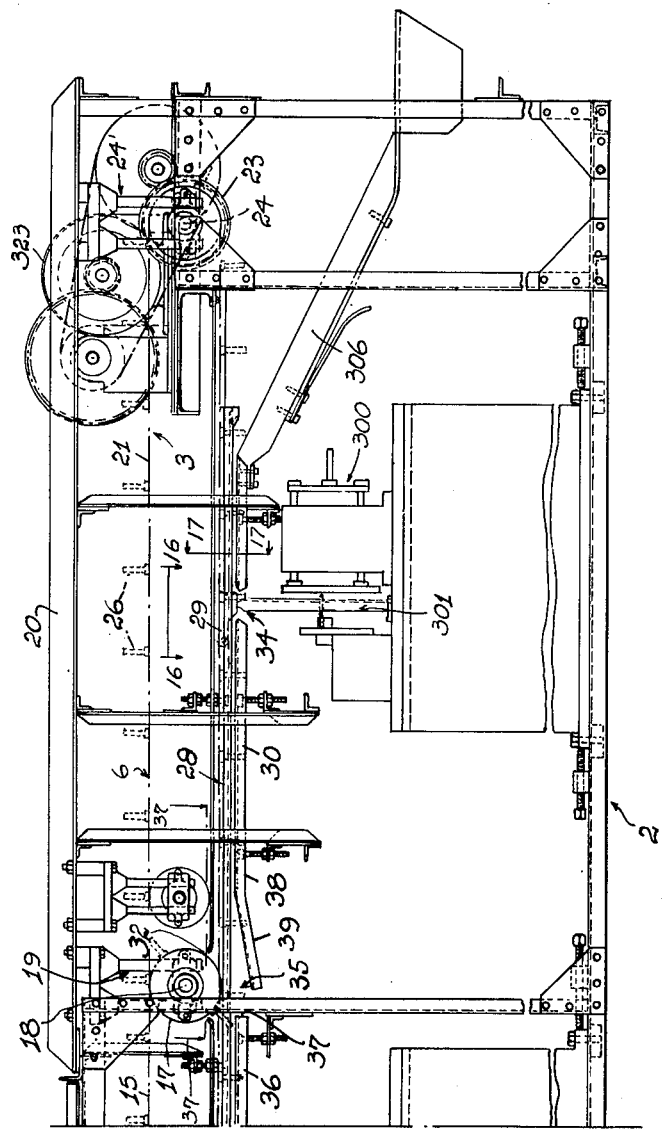

Figs. 6 and 7 disclose a side-view of the wire spring forming apparatus shown in Figs. 4 and 5.

Figure 8:
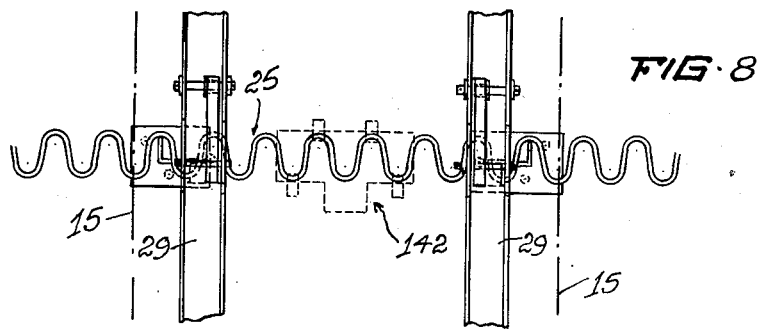

Fig. 8 is a fragmentary, partly diagrammatic plan view of the track arrangement at the first transfer station, as indicated by 8—8 in Fig. 6.

Figure 9:
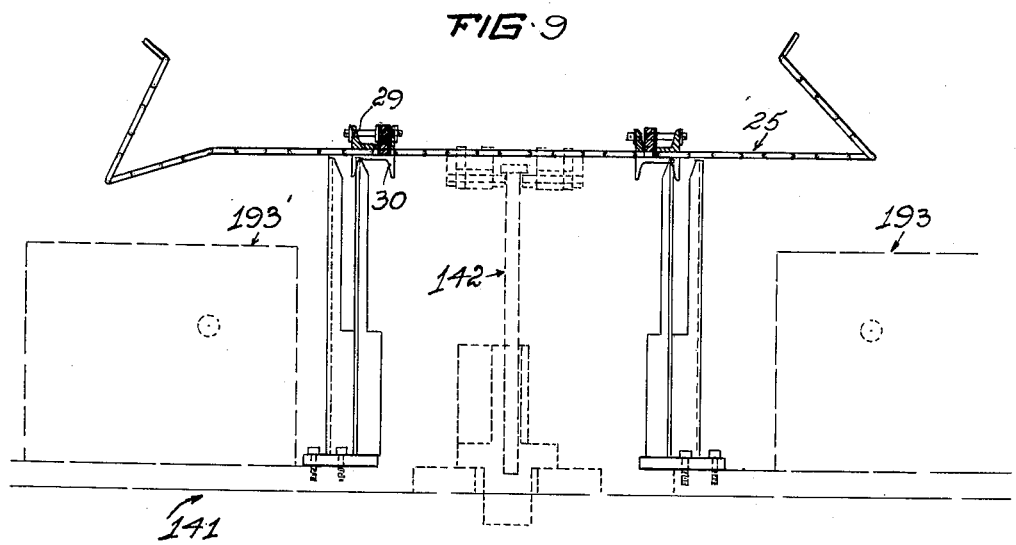

Fig. 9 is a sectional view through Fig. 6, the section being taken on line 9—9 of said figure.

Figure 10:
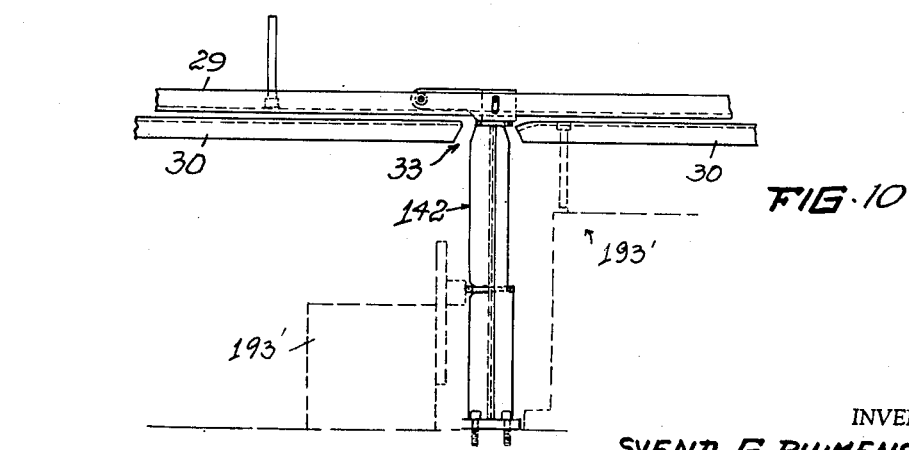

Fig. 10 is a side-view of Fig. 9.

Figure 11:
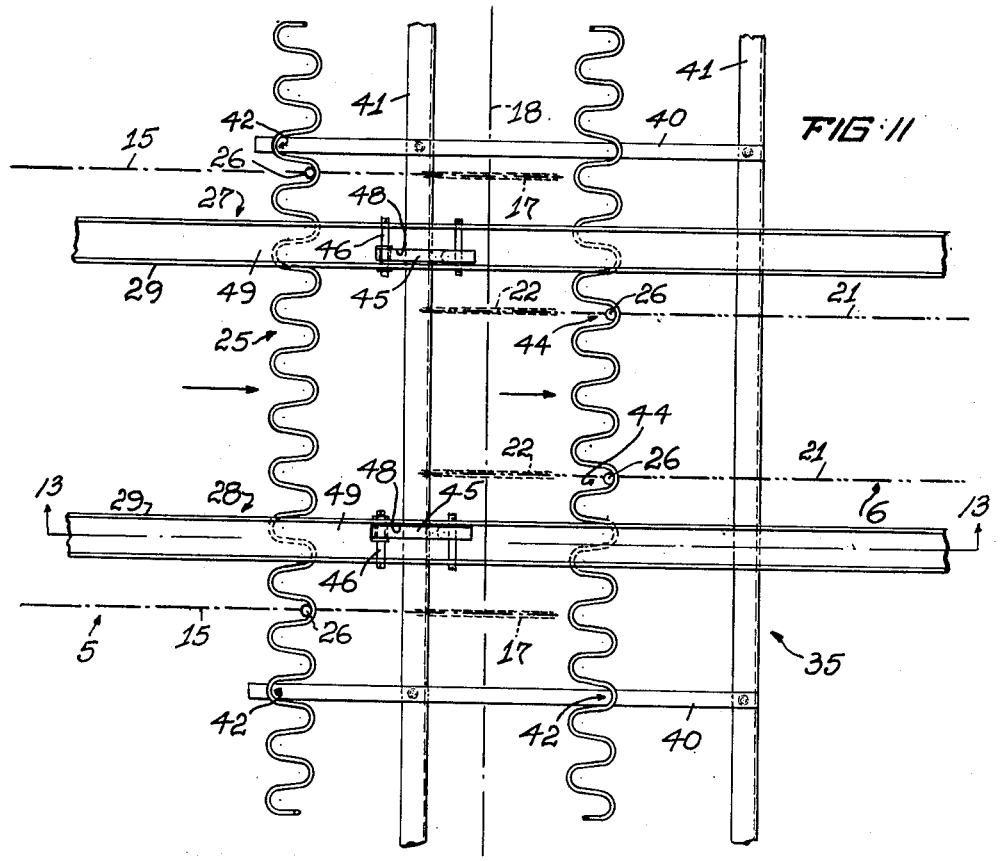

Fig. 11 is a fragmentary, partly diagrammatic plan view of the inverting mechanism in the track arrangement between the two transfer devices.

Figure 12:
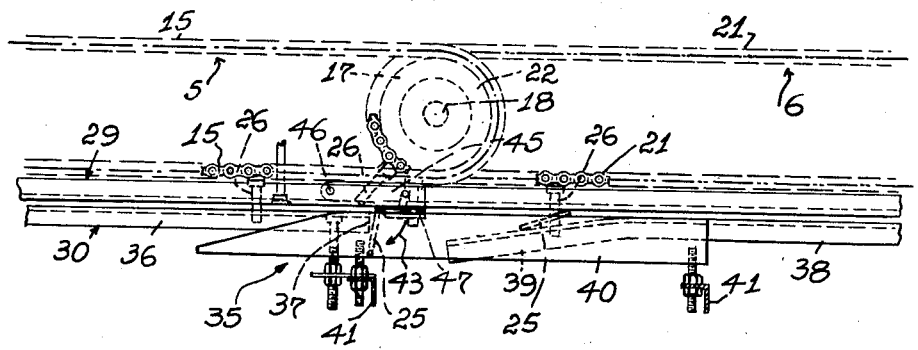

Fig. 12 is a side-view of Fig. 11.

Figs. 13 through 15 are sectional views through the inverting mechanism, the views being taken on line 13—13 of Fig. 11 showing wire strips in different positions during inverting operations; thus Fig. 13 is a sectional view showing a wire strip about to contact the pivoted friction lever of the inverting mechanism;

Fig. 14 is a sectional view similar to Fig. 13 showing such wire strip advanced from the track means to the supporting bars of the inverting mechanism; and Fig. 15 is a sectional view similar to Fig. 14 showing such wire strip in downwardly pivoted position after its disengagement from one drive conveyor section and while being engaged by the adjoining drive conveyor section.

Fig. 16 is a fragmentary, partly diagrammatic plan view of the track arrangement at the second transfer station, as indicated by 16—16 in Fig. 7.

Fig. 17 is a sectional view through Fig. 6, the section being taken on line 17—17 of said figure.

Fig. 18 is a side-view of Fig. 17.

Referring now more in detail to the drawings, the machine for forming sinuously corrugated wire strips into finished wire springs with specific seating or resting portions, specific supporting members for said resting portions and specific attachment means at the ends of the supporting members, embodies an elongated frame structure 2, which mounts therein, lengthwise thereof, conveying means 3. These conveying means, which are intermittently driven by a motor 323, consist of three interconnected conveyor sections 4, 5 and 6 which are arranged in overlapping relation and coupled with each other for simultaneous operation. Conveyor section 4 embodies a pair of drive chains 7, carried by pairs of chain wheels 8 and 9 on shafts 10 and 11 which are fulcrumed in bearings 12 and 13, adjustably secured to spaced longitudinal top members 14 of frame structure 2. Conveyor section 5 embodies a pair of drive chains 15 carried by pairs of chain wheels 16 and 17 on shafts 11 and 18, shaft 18 being fulcrumed in bearings 19 adjustably secured to longitudinal top members 20 of frame structure 2; and conveyor section 6 embodies a pair of drive chains 21 carried by pairs of chain wheels 22 and 23 on shafts 18 and 24, shaft 24 being fulcrumed in bearings 24' adjustably secured to the longitudinal top members 20. The conveyor sections 4, 5 and 6, thus directly coupled with each other, successively decrease in width, as the distance between drive chains 15 of conveyor section 5 is shorter than the distance of drive chains 7 of conveyor section 4, and as the distance between drive chains 21 of conveyor section 6 is shorter than the distance between drive chains 15 of conveyor section 5. Furthermore, chain wheels 16 on shaft 11 are arranged between chain wheels 9, and chain wheels 17 on shaft 18 are arranged between chain wheels 22.

The conveyor means advance the sinuously corrugated wire strips 25 through the wire spring forming apparatus by means of drive studs 26 secured to the drive chains of the conveyor sections, which drive studs engage predetermined loops of the wire strips to pull such wire strips through parallelly arranged track means 27 and 28, vertically adjustably mounted on frame structure 2 lengthwise thereof. These track means each embody oppositely arranged channel irons 29 and 30 which are arranged in inverted, slightly spaced position above each other to guide the wire strips 25 between the opposed web portions of the channel irons. Track means 27 and 28 have their upper channel irons 29 interrupted at 31 and 32 to permit removal of wire strips 25 from the track means and have their lower channel irons 30 interrupted at 33 and 34 to permit transfer of wire strips from track means 27 and 28 to twisting devices and hence back to the track means. In addition, track means 27 and 28 in conjunction with the overlapping end portions of conveyor sections 5 and 6 form wire strip inverting means 35 which effect inverting of the wire strips 25 by axially rotating same to upside-down position. For this purpose track means 27 and 28 include in lower channel irons 30, below the overlapping portions of conveyor sections 5 and 6, open breaks 37 and have channel portions 38 adjacent to open breaks 37 bent downwardly as at 39 to properly guide wire strips 25 in their inverted positions back between the channel irons 29 and 30 of the track means. Wire strip inverting means 35 additionally embody a pair of elongated, narrow bars 40 mounted on angle irons 41, which bars align with the left-handed loops 42 of strips 25 and support and suspend same when in inverting operations wire strips 25 by drive studs 26 of conveyor chains 15 and 21 are pulled through open breaks 37. When suspended from elongated bars 40, wire strips 25 are disengaged from drive studs 26 of conveyor chains 15 and engaged by drive studs 26 of conveyor chains 21 which pull the wire strips after their rotation in the direction of arrow 43 between channel irons 29, 30, the wire strips at this time being guided by the inclined end portions 39 of channel portions 38. Inverting of wire strips 25 is made possible by offsetting conveyor chains 15 with respect to conveyor chains 21, so that the drive studs 26 of drive chains 15 align with right-handed loops of the wire strips and that the drive studs 26 of drive chains 21 align with left-handed loops of the wire strips.

Preferably, as shown, wire strip inverting means 35 include in the upper channels 29 of the track means pivotally supported levers 45 which are adapted to assist in the disengagement of studs 26 of conveyor chains 15 from the wire strips when pulled through the open breaks 37. These levers are pivoted at their one ends on short shafts 46 arranged in the flanges of upper channels 29. Levers 45 include weighted end portions 47 provided with inclined front edges which extend into the path of wire strips 25 through slots 48 arranged in web portions 49 of upper channels 29 when such wire strips advance through the open breaks 37. The inclined end portions of lever 45 enter the open ends of the left-handed loops 42 of strips 25 and thereafter frictionally engage with their inclined front edges the central portions of the loops 42 to be tilted upwardly thereby when the strips continue to advance. Such upward tilting and the friction effects vibrations of the wire strips and facilitates the disengagement of the studs 26 of conveyor chains 15 from the wire strips which after disengagement from said studs by gravity action tilt downwardly for their inversion as described above.

In operation, the wire strips when advanced through the machine are carried by conveyor section 4 to a forming station which shapes end loops 51 of the wire strips to attachment means, punch presses 52 with forming dies 53, 54 being used for such purpose. Thereafter, the wire strips are advanced by conveyor section 5 and a transfer arrangement 142 to a first wire forming mechanism 141 which is arranged below track means 27, 28 opposite to the breaks 33 therein. The transfer arrangement 142 is specifically described in my co-pending divisional application Ser. No. 3,938, filed January 23, 1948, now Patent No. 2,584,836, dated February 5, 1952; therefore, no further description of the transfer arrangement is made herein. The wire forming mechanism 141 embodies two twisting devices 193 and 193' of a type specifically described in an application Ser. No. 617,226, filed September 19, 1945, now Patent No. 2,450,876, dated October 12, 1948, of which patent I am co-inventor and therefore further description of these twisting devices is also not made herein.

After being shaped in the twisting devices 193, 193', wire strips 25 are by the transfer arrangement 142 transferred back into the track means and thereafter advanced through inverting means 35 to a transfer arrangement 301 constructed similar to transfer arrangement 142 previously referred to. Transfer arrangment 301 transfers the wire strips to a wire forming mechanism 300 constructed similar to the wire forming mechanism 141 previously referred to.

The wire forming arrangement 300 shapes wire strips 25 to their final form, which thereafter are returned to the track means by the transfer device 301 and then discharged from such track means on inclined rails 306.

Wire strips 25 may be fed to conveyor section 4 manually or automatically. In the latter case, the wire strips are fed to the conveyor section by a feeding device 307 arranged at the front of frame structure 2. This feeding device embodies a horizontal slide member 308 adapted to be reciprocated by levers 310 on a shaft 311 journaled in frame structure 2. One of levers 310 is coupled by a link 312 with the crank arm 313 of a crank shaft 314 driven by a shaft 10 through an idler gear 316 which meshes a gear 317 on shaft 10 and a gear 315 on shaft 314. By this arrangement actuation of the conveying means simultaneously causes a timed reciprocatory movement of slide member 308. Preferably, track means 27, 28 include upwardly curved end portions 318 to facilitate proper automatic feeding of wire strips to the track means.

When operated, the driven conveying means 3 effect successive withdrawal of the wire strips 25 from the magazine 319 and feed such wire strips to the conveyor section 4 advancing wire strips 25 successively to punch presses 52 for reshaping the end loops 51 of the wire strips. Thereafter, the wire strips are advanced by conveyor section 5 and transfer arrangement 142 to the first forming mechanism 141; after forming, transferred back to conveyor section 5 and advanced to inverting means 35 for inverting the wire strips; then advanced to forming mechanism 300 by conveyor section 6 and transfer arrangement 301 for final forming and finally transferred back to conveyor section 6 and discharged therefrom.

Having thus described my invention, what I claim is:

1. In a machine for forming wire springs from sinuously corrugated wire strips having left and right-handed open loops, a pair of laterally spaced, parallel track members lengthwise of the machine, a chain conveyor above said track members in parallel relation with respect thereto including jointly driven chain conveyor sections formed by studded conveyor chains arranged to longitudinally overlap each other, and wire strip inverting means including open breaks in said track members below the overlapping portions of the conveyor chains and elongated, narrow supporting and guiding means below the overlapping portions of said conveyor chains, said supporting and guiding means extended into the plane of the track members and positioned to align with left-handed loops of wire strips advancing on the track members, the conveyor chains of one of the conveyor sections being aligned with right-handed loops of such wire strips and the conveyor chains of the other one of said conveyor sections being aligned with left-handed loops of such wire strips.

2. A machine for forming wire springs from sinuously corrugated wire strips as described in claim 1, wherein each track member is formed by pairs of superposed rails, wherein the open breaks in the track members are formed by open gaps in the lower rails of said pairs of superposed rails, and wherein the supporting and guiding means are formed by elongated narrow shoes arranged to engage left-handed loops of corrugated wire strips advanced by said studded conveyor chains between the superposed rails of said track members over the open gaps in their lower rails, and weighted means pivotally supported by the upper rails of the pairs of superposed rails positioned to rest on advancing corrugated wire strips and effect downward rotation of such strips when passing the open gaps in the lower rails of the track members.

3. A machine for forming wire springs as described in claim 1, wherein the track members are formed by pairs of superposed rails slightly spaced from each other to permit guiding of wire strips therebetween, wherein the open breaks in said track members are arranged only in the lower rails of such track members, and wherein the upper rails of said track members in the area of said open breaks pivotally support narrow, weighted lever means extended through slots in the upper rails, said weighted lever means positioned to align with left-handed loops of wire strips advancing on said track members to frictionally contact the curved parts of such left-handed loops of wire strips advancing through the inverting means.

4. A machine for forming wire springs as described in claim 3, wherein the lower rails of the track members laterally overlap the elongated, narrow supporting and guiding means, and wherein the forwardly extended overlapping portions of the lower rail are bent downwardly to facilitate shifting of wire strips in an inverted position from said supporting and guiding means back to said track members.

SVEND G. BLUMENSAADT.

References Cited in the file of this patent

UNITED STATES PATENTS

| Number | Name | Date |
| --- | --- | --- |
| 803,859 | Shipley | Nov. 7, 1905 |
| 1,295,769 | Kux | Feb. 25, 1919 |
| 1,301,559 | Hermsdorf | Apr. 22, 1919 |
| 1,320,662 | Tomlinson | Nov. 4, 1919 |
| 1,824,223 | Perry | Sept. 22, 1931 |
| 1,851,540 | Gail | Mar. 29, 1932 |
| 1,875,423 | Daniels | Sept. 6, 1932 |
| 1,877,111 | Wunderlich | Sept. 13, 1932 |
| 1,904,370 | Hunter | Apr. 18, 1933 |
| 1,909,499 | Oldham | May 16, 1933 |
| 2,011,142 | Brinton | Aug. 13, 1935 |
| 2,209,472 | Pedaline | July 30, 1940 |
| 2,217,333 | Dahlman | Oct. 8, 1940 |
| 2,249,996 | Wunderlich | July 22, 1941 |
| 2,255,635 | Walter | Sept. 9, 1941 |
| 2,288,031 | Schaefer et al. | June 30, 1942 |
| 2,348,400 | Manspeaker | May 9, 1944 |
| 2,387,674 | McIntire | Oct. 23, 1945 |
| 2,418,122 | Jeneson | Apr. 1, 1947 |
| 2,484,079 | Davis | Oct. 11, 1949 |
| 2,501,224 | Kadell | Mar. 21, 1950 |